(12) United States Patent
Boinowitz et al.

(10) Patent No.: US 6,194,475 B1
(45) Date of Patent: Feb. 27, 2001

(54) USE OF METAL SALTS OF RICINOLEIC ACID IN PRODUCING POLYURETHANE

(75) Inventors: Tammo Boinowitz; Georg Burkhart, both of Essen; Ralf Hoffmann, Senden; Felix Müller, Verlbert; Hans-Heinrich Schlöns; Andreas Weier, both of Essen; Volker Zellmer, Bottrop; Rainer Ziegler, Herne, all of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/464,968

(22) Filed: Dec. 16, 1999

(30) Foreign Application Priority Data

Dec. 21, 1998 (DE) ............................................. 198 59 099

(51) Int. Cl.[7] ................. C08J 9/04; C08J 9/22; C08J 9/224; C08J 9/40; C08K 5/56
(52) U.S. Cl. ................... 521/53; 521/55; 521/114; 521/116; 521/118; 521/124; 521/125; 521/126; 521/127; 521/129; 521/130; 521/906
(58) Field of Search ........................... 521/53, 55, 114, 521/116, 118, 124, 125, 126, 127, 129, 130, 906

(56) References Cited

U.S. PATENT DOCUMENTS

| | | | |
|---|---|---|---|
| 3,884,849 | * | 5/1975 | Molbert ................. 521/124 |
| 3,978,011 | * | 8/1976 | Molbert ................. 521/121 |
| 4,734,455 | * | 3/1988 | Mobley et al. .......... 524/710 |
| 5,004,776 | * | 4/1991 | Tadenuma et al. ....... 524/377 |
| 5,008,033 | | 4/1991 | Meyer et al. ......... 252/182.13 |
| 5,212,209 | | 5/1993 | Weaver et al. .......... 521/122 |

FOREIGN PATENT DOCUMENTS 0 490 342 A2  6/1992 (EP) .
WO 96/22182  7/1996 (WO) .

OTHER PUBLICATIONS

Herrington et al., Flexible Polyurethane Foams, Dow Chemical, p. 2.28–2.30, 1991.

* cited by examiner

Primary Examiner—Rabon Sergent
(74) Attorney, Agent, or Firm—Frommer Lawerence & Haug LLP

(57) ABSTRACT

The invention relates to the use of metal salts of ricinoleic acid or solutions thereof in water or in organic solvents in producing polyurethane foams.

19 Claims, No Drawings

USE OF METAL SALTS OF RICINOLEIC ACID IN PRODUCING POLYURETHANE

RELATED APPLICATIONS

This application claims priority to German application No. 198 59 099.7, filed on Dec. 21, 1998, herein incorporated by reference

BACKGROUND OF THE INVENTION

The invention relates to the use of metal salts of ricinoleic acid and solutions thereof in producing polyurethane foams (PU foams).

1. Field of the Invention

The excellent mechanical and physical properties of polyurethane foams lead to their use in a very wide variety of sectors. The automotive industry is a very important market for a great variety of PU foam grades, such as conventional flexible foams based on ether polyol or on ester polyol, cold-cure foams (also frequently termed HR foams) and rigid foams, and also foams whose properties lie between these classifications, e.g. semirigid systems. Examples are the use of rigid foams as headliners, ester foams for internal door trims and also for die-cut sun visors, and cold-cure foams and flexible foams for seat systems.

2. Description of the Related Art

In recent years there has been a marked tightening of the requirements placed by automotive manufacturers on their foam suppliers, in particular in relation to an emission specification. Whereas previously the sole emphasis was the permanent fogging performance of the foams (DIN 75 201, Determination of the windscreen fogging characteristics of trim materials in motor vehicles), nowadays the content of volatile organic constituents (VOC=volatile organic compounds) is also analyzed (Volkswagen central standard 55 031 and Daimler Benz PB VWT 709). The Daimler Benz method requires classification of the individual chemical compounds in the emissions as well as quantitative determination of the VOC value and fogging value.

A conventional flexible foam with a density of 25 kg/m$^3$ typically has the following VOC emissions: overall value 800 ppm, comprising 550 ppm of BHT (bis-2,6-tert-butyl-4-hydroxytoluene), 200 ppm of 2-ethylhexanoic acid, 20 ppm of tertiary amines, 10 ppm of siloxanes and 20 ppm of unidentified compounds. The emissions are, of course, highly dependent on the particular mixing specification used, but BHT and 2-ethylhexanoic acid are always the main components. BHT typically derives from the polyol and isocyanate. The manufacturers of these raw materials have recently begun to supply their products also as BHT-free grades. Using these raw materials it is possible to produce foams with a VOC value of about 250 ppm. 2-ethylhexanoic acid is a decomposition product of the stannous octoate which acts as catalyst for the polyurethane reaction. Since there is no industrially available alternative to stannous octoate which fully covers its application profile, the VOC value cannot be significantly reduced in the prior art, and certainly not to a value<100 ppm.

Since automotive manufacturers have now specified a guideline VOC value of 100 ppm to be achieved in the coming years, there is an urgent requirement in the industry to reduce the emission of 2-ethylhexanoic acid.

Related to the problem of emissions, the automotive industry is attempting to reduce the odor from PU foams. One sign of this is the implementation of tests on PU foam products received, using what is known as an "electronic nose" (Aroma Scan, UK), automating the work of panels of odor testers.

The substances responsible for odor in foams have not yet been clearly identified. It is certain that a wide variety of classes of substance is involved, and these may be necessary constituents of the formulation (e.g. tertiary amines), contaminants in the raw materials (e.g. aldehydes in the polyetherol) or products of side reactions during foam production.

There is currently no industrial solution for meeting this requirement. In the automotive industry, and in particular in aircraft construction, specifically flame-retardant foam qualities are needed. To this end, flame retardants are added to PU foams. The chemicals used here are in most cases halogenated phosphoric esters. In 1986 in the U.S. alone, 13,000 metric tons of flame retardant were mixed into PU foams (J. Troitzsch, International Plastics Flammability Handbook, 1990). It is known that specifically these flame retardants contribute considerably to the emissions from foams. Foams produced with the widely used flame retardant TDCPP (tris(1, 3-dichloroisopropyl) phosphate) give off a large number of volatile compounds, the majority of which are chlorinated propyl alcohols. There is therefore a requirement to comply with flame-retardancy specifications while reducing, or eliminating, the use of flame-retardants.

SUMMARY OF THE INVENTION

Surprisingly, there has now been found a group of compounds whose use in polyurethane foam solves the above-mentioned industrial problems.

This involves the use of metal salts of ricinoleic acid or solutions thereof in water or in organic solvents during the production of polyurethane foams. For the purposes of the present invention, the term "production" covers either addition prior to the actual foaming, or posttreatment of the finished foam, for example by spray-application or by saturating with a solution of the metal salt. For the purposes of the present invention, polyurethane foams are either flexible foams based on ether polyols or on ester polyols or else rigid foams, or else foams whose properties lie between these classifications, e.g. semi-rigid systems.

Adding the metal salts of ricinoleic acid allows foams to be produced with lower emission values, better flame-retardancy properties and less odor. In addition, the hardening of the foam surface is accelerated. These advantages can be achieved without changing the other physical properties, e.g. density, hardness, rebound resilience or compressive strength.

DESCRIPTION OF THE PREFERRED EMBODIMENTS

Particularly suitable ricinoleates are those of the metals of the 1st, 2nd or 4th main group, or also the 1st, 2nd or 8th transition group, of the periodic table.

The metal salt of ricinoleic acid here may be dissolved in advance in what is known as the activator solution, composed of water, tertiary amine, silicone stabilizer and, if desired, emulsifier. Direct feeding of the solid ricinoleate into the components for the foaming gives a foam with non-uniform cell structure. Since many foamers only have direct-feed equipment, a product in which the metal salt of ricinoleic acid is present in dissolved form represents a considerable improvement. Anhydrous solutions are preferable here, since otherwise the water from the solvent reacts with the isocyanates and must therefore be taken account of in the formulation. Some transition metal salts moreover have only limited resistance to hydrolysis.

Suitable anhydrous solvents for the metal salt of ricinoleic acid are in principle combinations of from about 5 to about 50% by weight, based on the weight of solvent and salt, of an ethoxylated fatty alcohol with a straight or branched alkyl chain and with from 10 to 18 carbon atoms and with less than 30 ethylene oxide units and from about 5 to about 30% by weight of a tertiary amine. Up to about 60% by weight of the metal salt of ricinoleic acid can be dissolved in solvents of this description to give a clear solution.

Preference is given to a combination of from 5 to 35% by weight of a fatty alcohol with a straight or branched alkyl chain and with from 10 to 18 carbon atoms and with less than 20 ethylene oxide units and from 5 to 30% by weight of a tertiary amino alcohol.

The amino alcohol used is particularly preferably N,N,N',N'-tetrakis(2-hydroxypropyl)ethylenediamine.

Among the preferred cations, particular preference is given to zinc, and in particular in bivalent form.

A solution of this type has been described, for example, in DE-A-40 14 055 as an agent with a deodorizing action. Applications described are cosmetics, washing and cleaning, and odor absorption in industrial applications. The use according to the invention in PU foam differs from these applications in three fundamental points.

Firstly, the metal salt of ricinoleic acid is exposed to highly reactive reaction partners, such as isocyanates, during the production of the PU foams. The skilled worker would expect here that a reaction would occur with the hydroxyl function of the ricinoleate, leading to incorporation into the polymer matrix. Secondly, the effects of the zinc ricinoleate on the carefully balanced catalysis of the PU foam, and therefore the possibility of producing a physically identical foam, are unforeseeable. It is also impossible to foresee what effect the amino alcohol used as a component in the solvent might on the catalysis. Thirdly, the substance 2-ethylhexanoic acid, the emission of which is to be suppressed, is not formed from the stannous octoate until foam production has begun. This means that all of the transport phenomena relating to the coming together of the reaction partners 2-ethylhexanoic acid and metal salt of ricinoleic acid have to have occurred within the short time of the PU reaction, which typically lasts about 100 seconds, before the polymer matrix sets.

The use of stannous octoate during the production of polyetherol-based flexible PU foams is prior art (George Woods, The ICI Polyurethanes Book, Wiley, p. 45 and Ron Herrington, Flexible Polyurethane Foams, Dow Chemical, p. 2.30). The stannous octoate is a catalyst for the reaction of isocyanates with polyols (also termed a gelling catalyst), via a complex transition state. During the production of the foam the stannous octoate hydrolyzes and releases the 2-ethylhexanoic acid. This decomposition is desirable, since it is required for suppression of the reaction which reverses urethane bonding to give the starting materials. The ethyl branching in the octoate is decisive for forming the desired ligand complex.

The substances according to the invention do not have any alkyl branching and cannot be compared with stannous octoate, since their metal content is low.

The use of zinc stearate as an internal release agent for producing RIM (reaction injection molding) foams is widely covered in the patent literature, for example in U.S. Pat. 5,008,033, U.S. Pat. 5,212,209, EP-A 0 490 342, and WO 96/22182. What is claimed in these texts is the use of metal salts of higher carboxylic acids, preferably zinc stearate, and addition of these for compatibilization in the RIM mixture.

It should be pointed out that polyurethane RIM systems differ significantly from the foam systems according to the invention. RIM systems involve compact moldings or microcellular systems, but never open-pore foams. The densities of the two systems therefore differ dramatically. RIM moldings have densities of >700 kg/m$^3$, while the PU foams according to the invention have densities of <500 kg/m$^3$. The catalysis of RIM systems differs significantly. In RIM systems dibutyltin laurate is typically used instead of tin octoate. As the comparative examples show, neither zinc stearate (the zinc salt of octadecanoic acid) nor zinc oleate (the zinc salt of 9-octadecenoic acid) nor zinc 12-hydroxystearate has any advantage according to the invention.

The examples below describe firstly the production of the polyurethane foams using the compounds according to the invention. The results of performance testing on these test specimens are then given.

The compounds not according to the invention which are selected for comparison are molecules as closely structurally related as possible to zinc ricinoleate (the zinc salt of 12-hydroxy-9-octadecenoic acid), zinc oleate (the zinc salt of 9-octadecenoic acid), zinc stearate (the zinc salt of octadecanoic acid) and zinc 12-hydroxystearate.

EXAMPLES

Production of the Polyurethane Foams

The following mixing specification was used to produce the polyurethane foams: 100 parts by weight of polyetherol (hydroxyl number=47 mg KOH/g, 11% EO), 4.0 parts by weight of water, 0.80 parts by weight of TEGOSTAB® BF 2370 (trademark of Th. Goldschmidt AG) (silicone stabilizer), 0.15 parts by weight of a tertiary amine, 0.20 parts by weight of KOSMOS® 29 (trademark of Th. Goldschmidt AG) (stannous octoate), 48.3 parts by weight of toluene diisocyanate T 80 (index 105), as appropriate a variable amount of the metal salt of ricinoleic acid according to the invention, as appropriate 1.0 part by weight of a non-inventive metal salt of a carboxylic acid and also, as appropriate, 6.0 or 8.0 parts by weight of the flame retardant TDCPP (=tris(1,3-dichloroisopropyl) phosphate). In some of the examples the amount of stannous octoate used was also varied. 300 g of polyol were used during the foaming, and the amounts of the other formulation constituents were converted correspondingly. For example, 1.0 part of a component here means 1 g of this substance per 100 g of polyol.

For foaming, the polyol, water, amine, stannous octoate, silicone stabilizer and, where appropriate, the additive according to the invention were thoroughly mixed with stirring. Addition of the isocyanate was followed by stirring for 7 sec. with a stirrer at 3000 rpm, and the mixture was poured into a paper-lined wooden box (base area 27 cm×27 cm). This gave a foam which was subjected to the performance tests described below.

Table 1 summarizes the variable constituents in the mixing specifications of the foams of the examples.

TABLE 1

| Example No. | According to the invention | Salt of ricinoleic acid [parts/metal cation] | Stannous octoate [parts] | Flame retardant [parts] |
|---|---|---|---|---|
| 1 | no | 0 | 0.20 | 0 |
| 2 | yes | 0.1/zinc | 0.20 | 0 |
| 3 | yes | 0.5/zinc | 0.20 | 0 |
| 4 | yes | 1.0/zinc | 0.20 | 0 |
| 5 | no | 1.0 zinc stearate | 0.20 | 0 |
| 6 | no | 1.0 zinc oleate | 0.20 | 0 |
| 7 | no | 1.0 zinc | 0.20 | 0 |

TABLE 1-continued

| Example No. | According to the invention | Salt of ricinoleic acid [parts/metal cation] | Stannous octoate [parts] | Flame retardant [parts] |
|---|---|---|---|---|
| 8 | yes | 1.0/zinc 12-hydroxystearate | 0.18 | 0 |
| 9 | yes | 1.0/zinc | 0.16 | 0 |
| 10 | yes | 1.0/zinc | 0.14 | 0 |
| 11 | no | 0 | 0.2 | 6.0 |
| 12 | no | 0 | 0.2 | 8.0 |
| 13 | yes | 1.0/zinc | 0.16 | 6.0 |
| 14 | yes | 1.0/zinc | 0.16 | 8.0 |
| 15 | yes | 1.0/Na | 0.16 | 8.0 |
| 16 | yes | 1.0/Ca | 0.16 | 8.0 |
| 17 | yes | 1.0/Sn | 0.16 | 8.0 |
| 18 | yes | 1.0/Sn | 0.1 | 8.0 |
| 19 | yes | 1.0/Sn | 0.0 | 8.0 |
| 20 | no | 1.0 zinc stearate | 0.16 | 8.0 |
| 21 | no | 1.0 zinc oleate | 0.16 | 8.0 |
| 22 | no | 1.0 zinc 12-hydroxystearate | 0.16 | 8.0 |

Performance Tests
Physical Properties of the Foams

The foams produced were assessed on the basis of the following physical properties:
 a) The extent to which the foam sinks back after full rise (=settling)
 b) Foam height
 c) Foam density (FD)
 d) The air-permeability of the foam was determined by measuring the pressure needed to compress the foam. This pressure was given in mm of water, and lower pressure values then indicate a more open foam. The values are measured in the range from 0 to 300 mm.
 e) Compressive strength CLD, 40%
 f) Compression set, on compression by 90% for 22 h at 70° C.
 g) Rebound resilience (ball rebound test)

TABLE 2

| No. | Full rise time [s] | Settling [cm] | Height [cm] | FT [kg/m³] | Porosity [mm] | CLD 40% [kPa] | Compressive deformation | Rebound [cm] |
|---|---|---|---|---|---|---|---|---|
| 1 | 105 | 0.0 | 30.5 | 26.2 | 10 | 3.4 | 6% | 48 |
| 2 | 96 | −0.1 | 30.0 | 26.1 | 11 | 3.4 | 6% | 48 |
| 3 | 91 | −0.1 | 30.1 | 26.2 | 19 | 3.5 | 7% | 49 |
| 4 | 90 | −0.2 | 29.8 | 26.0 | 46 | 3.7 | 6% | 48 |
| 5 | 115 | −0.1 | 29.2 | 26.3 | 8 | 3.3 | 6% | 48 |
| 6 | 106 | −0.1 | 29.3 | 26.2 | 10 | 3.4 | 6% | 49 |
| 7 | 109 | 0.0 | 29.7 | 26.5 | 9 | 3.5 | 6% | 48 |
| 8 | 100 | +0.1 | 30.3 | 26.0 | 25 | 3.4 | 7% | 48 |
| 9 | 104 | 0.0 | 30.3 | 26.2 | 11 | 3.5 | 7% | 48 |
| 10 | 113 | −0.1 | 30.0 | 26.2 | 10 | 3.3 | 6% | 48 |
| 11 | 104 | 0.0 | 29.4 | 26.3 | 7 | 3.4 | 6% | 50 |
| 12 | 107 | −0.1 | 29.4 | 26.6 | 9 | 3.3 | 6% | 48 |
| 13 | 102 | 0.0 | 29.2 | 26.4 | 10 | 3.4 | 7% | 49 |
| 14 | 106 | 0.0 | 29.2 | 26.9 | 9 | 3.3 | 7% | 49 |
| 15 | 125 | −0.1 | 28.2 | 25.8 | 7 | 3.1 | 6% | 48 |
| 16 | 123 | 0.8 | 29.2 | 26.4 | 8 | 3.2 | 6% | 48 |
| 17 | 90 | −0.1 | 30.3 | 25.7 | 16 | 3.3 | 7% | 48 |
| 18 | 101 | −0.2 | 30.1 | 26.2 | 11 | 3.4 | 6% | 49 |
| 19 | 121 | −0.2 | 29.4 | 26.3 | 8 | 3.2 | 6% | 48 |
| 20 | 113 | −0.1 | 29.3 | 26.3 | 10 | 3.4 | 6% | 49 |
| 21 | 104 | −0.1 | 30.0 | 26.2 | 11 | 3.2 | 6% | 48 |
| 22 | 108 | 0.0 | 28.9 | 26.1 | 9 | 3.4 | 7% | 48 |

As can be seen from the low settling values, adding the metal salts of ricinoleic acid according to the invention allows stable polyurethane foams to be produced. Examples 1 to 4 indicate a catalytic action of the zinc ricinoleate on the polyurethane reaction. The open-cell character of the foams also reduces, the water pressure required for compression moving from 11 to 46 mm.

Both effects, shorter full rise time and reduced porosity, may readily be compensated by reducing the amount of stannous octoate in the formulation (compare Examples 8 to 10). Example 8, with 0.16 part of stannous octoate and 1.0 part of zinc ricinoleate, has the same porosity and full rise time as Example 1 without zinc ricinoleate and with 0.20 part of tin octoate. The reduction in the stannous octoate content is desirable since it contributes to emissions. The other physical properties of these foams are also the same.

Physically identical foams can also be produced in flame-retardant formulations (see Examples 11 to 14).

Physically identical foams also result using the ricinoleates of the other metal cations (see Examples 15 to 17). Example 19 shows that satisfactory foams can also be produced without the use of tin octoate, using a ricinoleate according to the invention.

Measurement of 2-ethylhexanoic acid emissions

The emission of 2-ethylhexanoic acid was determined by a method based on the Mercedes-Benz test specification PB VWT 709.

The thermodesorption followed by coupled gas chromatography/mass spectrometry (GC/MS) was carried out as described below.

a) Measurement Technique:

The thermodesorption was carried out using a "TDS2" thermodesorber with a sample-changer from Gerstel, Muilheim, together with a Hewlett Packard HP6890/HP5973 GC/MSD system.

| | |
|---|---|
| Thermodesorption | Gerstel TDS 2 |
| Desorption temperature | 90° C. |
| Desorption time | 30 min |
| Flow rate | 60 ml/min |
| Transfer line | 280° C. |
| Cryofocussing | HP 6890 PTV |
| Liner | Glass vaporizer tube with silanized glass wool |
| Temperature | −150° C. |
| GC | HP 6890 capillary GC |
| Injector | PTV split 1:50 |
| Temperature program | −150° C.; 3 min;  720° C./min; 280° C. |
| Column | 60 m * 0.25 mm Optima 5 MS dF 0.5 µm |
| Flow rate | 1 ml/min const. flow |
| Temperature program | 50° C.; 5 min;  3° C./min; 92° C.;  5° C./min; 160° C.; |
| | 10° C./min; 280° C.; 20 min |
| Detector | HP MSD 5973 |
| Mode | Scan 29-350 amu 2.3 scans/sec |
| Evaluation | Evaluation of the total ion flow chromatogram Calculation of 2-ethylhexanoic acid peak as toluene equivalent | b) Conditions for Measurement:
c) Calibration

For calibration, 1 µl of a mixture of toluene and hexadecane in pentane (in each case 0.6 mg/ml) was placed on a clean adsorption tube packed with Tenax TA (mesh 35/60) and measured (desorption 5 min; 280° C.)

d) Sample Preparation 10 mg of foam, divided into three samples, was inserted into a thermodesorption tube. Care is taken here that the foam is not compressed.

e) Evaluation

To quantify the emission of 2-ethylhexanoic acid, the area of the peak recognized as 2-ethylhexanoic acid in the mass spectrum was determined as ppm toluene equivalent, using the response factor of toluene from the calibration.

Table 3 summarizes the results of 2-ethylhexanoic acid emissions for selected examples.

TABLE 3

| No. | According to the invention | Zinc ricinoleate [parts] | Stannous octoate [parts] | 2-Ethyl-hexanoic acid [ppm] | 2-Ethyl-hexanoic acid [%] |
|---|---|---|---|---|---|
| 1 | no | 0 | 0.20 | 218 | 100* |
| 2 | yes | 0.1 | 0.20 | 203 | 93 |
| 3 | yes | 0.5 | 0.20 | 126 | 58 |
| 4 | yes | 1.0 | 0.20 | 57 | 26 |
| 9 | yes | 1.0 | 0.16 | 46 | 21 |
| 5 | no | 1.0 zinc stearate | 0.20 | 224 | 103 |
| 6 | no | 1.0 zinc oleate | 0.20 | 213 | 98 |
| 7 | no | 1.0 zinc 12-hydroxystearate | 0.20 | 208 | 95 |

*The initial value of 218 ppm was selected to be set at 100%

It is clear from the results that emission of 2-ethylhexanoic acid is dramatically reduced by adding zinc ricinoleate. The reduction in the emission here is approximately proportional to the amount used of the additive according to the invention.

Foam Example 6 has the same porosity and full rise time as Example 1 (see Table 2). This means that the reduction in the emission of 2-ethylhexanoic acid can be further amplified by replacing some of the stannous octoate with zinc ricinoleate.

The non-inventive zinc salts of the other carboxylic acids do not have any action of any type in relation to emission of 2-ethylhexanoic acid.

Flame-retardant Properties

The capacity of the foams in the examples to be destroyed by fire was determined to ASTRM D 1692, as described in American National Standard K 65.114. For this, test specimens of dimensions 50×0.25×150 mm were prepared. The foams were placed on a wire gauze and ignited on one side with a Bunsen burner. The time required for the flame to self-extinguish, and also the extent of the burnt area, was then determined.

Table 4 shows the burning times and the burning length for selected examples.

TABLE 4

| No. | According to the invention | Ricinoleate [parts/cation] | Flame retardant [parts] | ASTM D 1692 time [s] | ASTM D 1692 length [mm] |
|---|---|---|---|---|---|
| 11 | no | 0 | 6.0 | 55 | 75 |
| 13 | yes | 1.0/zinc | 6.0 | 45 | 60 |
| 12 | no | 0 | 8.0 | 48 | 60 |
| 14 | yes | 1.0/zinc | 8.0 | 42 | 53 |
| 15 | yes | 1.0/Na | 8.0 | 45 | 55 |
| 16 | yes | 1.0/Ca | 8.0 | 44 | 56 |
| 17 | yes | 1.0/Sn | 8.0 | 43 | 54 |
| 20 | no | 1.0 zinc stearate | 8.0 | 49 | 62 |
| 21 | no | 1.0 zinc oleate | 8.0 | 47 | 61 |
| 22 | no | 1.0 zinc 12-hydroxystearate | 8.0 | 48 | 60 |

If Examples 11 and 13 and, respectively, 12 and 14 are compared with one another, it is clear that there is a significant shortening of the burning time and extent of burning in the foams produced with zinc ricinoleate. Examples 12 and 13 illustrate that adding 1.0 parts of zinc ricinoleate corresponds approximately to the effect of 2.0 parts of flame retardant (TDCPP). It is known that open-cell foams burn more readily because the supply of oxygen is better, and it should therefore be noted that all of the foams have comparable porosity.

The foams produced using sodium ricinoleate, calcium ricinoleate and tin ricinoleate also burn significantly less readily than Comparative Example 12.

The non-inventive zinc salts of the other carboxylic acids are not effective in any way in improving flame retardancy.

Surface Curing

As described above, the foams of the examples were produced in a box made of wood. The top of the resultant foam had a rounded shape and was tacky immediately after production. It dried after some time has elapsed. This phenomenon is also described as surface curing.

To determine this time, after 15 min. the rounded top of the foam was covered with a carbon paper and loaded with a weight of 100 g, so that a constant contact pressure was used. If the surface had not yet hardened, the carbon dust adheres firmly to the foam, and marks could be seen on the surface of the foam. Once drying took place, the carbon dust no longer adhered firmly, and no marks could be seen on the foam. The point in time after which marks could no longer be seen is termed the curing time.

Table 5 gives the curing times at 25° C.

TABLE 5

| Example No. | According to the invention | Zinc ricinoleate [parts] | Curing time [min] |
|---|---|---|---|
| 1 | no | 0 | 240 |
| 2 | yes | 0.1 | 225 |
| 3 | yes | 0.5 | 180 |
| 4 | yes | 1.0 | 120 |
| 20 | no | 1.0 zinc stearate | 225 |
| 21 | no | 1.0 zinc oleate | 240 |

The curing times of the foam surfaces could be shortened significantly by adding zinc ricinoleate. This possibility of shortening the hardening time implies a considerable advantage in production.

The non-inventive zinc salts of the other carboxylic acids do not have any kind of effect relation to accelerating surface-curing.

Odor of the Foams

After curing of the surface, the polyurethane foams produced were packed in odorless polyethylene bags. During storage for 12 h at 25° C. there was an exchange of gas between air in the PE bag and the gas mixture in the open foam pores. After opening the PE bag, the odor of the gas mixture which emerges was assessed by five testers on a scale from 1 to 6.1 describes a low-odor foam and 6 describes a foam with intense odor.

After the gas has been checked, the foams were cut open, and the odor at the freshly cut surfaces was assessed in the same way. The evaluation of the foams is described in Table 6.

Each of the values given is an average of the judgments of the five testers, and the numbers in brackets are the outermost values.

TABLE 6

| Example No. | According to the invention | Zinc ricinoleate [parts] | Odor of the gas mixture | Odor of the cut surfaces |
|---|---|---|---|---|
| 1 | no | 0 | 4.6 (3/6) | 4.8 (4/6) |
| 2 | yes | 0.1 | 4.4 (2/6) | 4.2 (2/6) |
| 3 | yes | 0.5 | 3.4 (2/5) | 3.6 (3/5) |
| 4 | yes | 1.0 | 2.2 (1/3) | 2.4 (1/3) |

TABLE 6-continued

| Example No. | According to the invention | Zinc ricinoleate [parts] | Odor of the gas mixture | Odor of the cut surfaces |
| --- | --- | --- | --- | --- |
| 20 | no | 1.0 zinc stearate | 4.2 (2/6) | 4.8 (4/6) |
| 21 | no | 1.0 zinc oleate | 4.6 (3/6) | 4.4 (2/6) |

Even taking into account the fact that odor panels of this type usually produce very large scatter, these values have to be considered as conclusive, as described below.

The subjective perception of odor from the foams evaluated decreases with the use of zinc ricinoleate. This agrees with the absorptive effect demonstrated earlier (see also emission of 2-ethylhexanoic acid). This way of controlling the odor of polyurethane foams is highly advantageous industrially, in particular when the production of PU foams for beddings, furniture and automobiles is involved.

The non-inventive zinc salts of the other carboxylic acids do not have any significant effect in their relation to improving the odor of foams.

The above description of the invention is intending to be illustrative and not limiting. Various changes and modifications in the embodiments described above may occur to those skilled in the art. These changes can be made without departing from the scope of spirits of the invention.

What is claimed is:

1. A process for preparing a polyurethane foam which comprise either:
   a) preparing a mixture comprising polyurethane precursors, adding to said mixture a ricinoleic metal salt or a solution containing said salt and foaming the resulting mixture; or
   b) post-treating the polyurethane foam by applying solution comprising a ricinoleic metal salt.

2. The process according to claim 1, wherein the solvent is water.

3. The process according to claim 1, wherein the solvent is an organic solvent.

4. The process according to claim 1, wherein the salt is a salt of a metal from the 1st, 2nd, or 4th main group of the Periodic Table.

5. The process according to claim 1, wherein the salt is a salt of a metal from the 1st, 2nd, or 8th transition group of the Periodic Table.

6. The process according to claim 1, wherein the salt is zinc, tin, sodium or calcium salt.

7. The process according to claim 1, wherein the salt is zinc salt.

8. The process according to claim 1, wherein the ricinoleic metal salt or solution containing the salt is added to a mixture comprising polyurethane precursors and the resulting mixture is foamed.

9. The process according to claim 1, wherein the solution comprising a ricinoleic metal salt is applied to the polyurethane foam.

10. The process according to claim 9, wherein the solution is applied by spraying the polyurethane foam with the solution.

11. The process according to claim 9, wherein the solution is applied by soaking the polyurethane foam in the solution.

12. The process according to claim 1, wherein the solution is anhydrous.

13. The process according to claim 12, wherein the solution comprises from about 5 to about 50% by weight, based on solvent and salt, of an ethoxylated fatty alcohol having from 10 to 18 carbon atoms and less than 30 ethylene oxide units and from about 5 to about 30% by weight based on solvent and salt of a tertiary amine.

14. The process according to claim 13, wherein the tertiary amine is a tertiary amino alcohol.

15. The process according to claim 14, wherein the tertiary amino alcohol is N,N,N',N-tetrakis(2-hydroxypropyl)ethylenediamine.

16. The process according to claim 2, wherein the solvent further comprises a tertiary amine, a silicone stabilizer and an emulsifier.

17. The process according to claim 1, wherein the polyurethane foam is a flexile foam.

18. The process according to claim 1, wherein the polyurethane foam is a rigid foam.

19. A polyurethane foam obtained by the process according to claim 1.

* * * * *